(12) United States Patent
Wang et al.

(10) Patent No.: US 11,607,758 B2
(45) Date of Patent: Mar. 21, 2023

(54) DEVICE FOR PICKING AND TIGHTENING SCREW

(71) Applicants: FOXCONN PRECISION ELECTRONICS (TAIYUAN) CO., LTD., Taiyuan (CN); HON HAI PRECISION INDUSTRY CO., LTD., New Taipei (TW)

(72) Inventors: Ming-Ya Wang, Taiyuan (CN); Yong Liu, Taiyuan (CN); Jen-Chang Huang, New Taipei (TW); Wen-Shou Tseng, New Taipei (TW)

(73) Assignees: FOXCONN PRECISION ELECTRONICS (TAIYUAN) CO., LTD., Taiyuan (CN); HON HAI PRECISION INDUSTRY CO., LTD., New Taipei (TW)

( * ) Notice: Subject to any disclaimer, the term of this patent is extended or adjusted under 35 U.S.C. 154(b) by 729 days.

(21) Appl. No.: 16/669,649

(22) Filed: Oct. 31, 2019

(65) Prior Publication Data
US 2020/0282499 A1    Sep. 10, 2020

(30) Foreign Application Priority Data
Mar. 5, 2019    (CN) .......................... 201920277284.7

(51) Int. Cl.
*B23P 19/00*    (2006.01)
*B23P 19/06*    (2006.01)

(52) U.S. Cl.
CPC ........... *B23P 19/006* (2013.01); *B23P 19/066* (2013.01)

(58) Field of Classification Search
CPC ....... B23P 19/006; B23P 19/066; B23P 19/06; B23P 19/004
See application file for complete search history.

(56) References Cited

U.S. PATENT DOCUMENTS

| | | | | |
|---|---|---|---|---|
| 3,583,451 A | * | 6/1971 | Dixon .................. | B23P 19/006 81/433 |
| 8,245,601 B1 | * | 8/2012 | Hastama ................ | B25B 23/08 81/55 |
| 8,347,766 B2 | * | 1/2013 | Ota ........................ | B25B 23/04 81/57.37 |

FOREIGN PATENT DOCUMENTS

CN    105945562 A  *  9/2016  ............ B23P 19/004

OTHER PUBLICATIONS

CN-105945562-A—Machine translations, Liang—2016 (Year: 2016).*
Liang, CN-105945562-A—Machine translations, 2016 (Year: 2016).*
Liang; CN-105945562-A Sep. 2016 (Year: 2016).*

* cited by examiner

*Primary Examiner* — Lee A Holly
(74) *Attorney, Agent, or Firm* — ScienBiziP, P.C.

(57) ABSTRACT

A device for lifting and tightening screws includes a transporting unit to move the device to a screw suction position or a screw locking position, a suction nozzle unit, a vacuum generator, and an electronic screwdriver unit. When the device is moved to a position to attract and apply suction to a screw, the suction nozzle unit captures a screw. When the device is moved to the screw locking position, the electronic screwdriver unit tightens the screw. The device prevents the suction nozzle from contacting the workpiece, guides a suction position of the screw, and can function in relation to screw holes surrounded by steps and barriers.

9 Claims, 6 Drawing Sheets

DEVICE FOR PICKING AND TIGHTENING SCREW

FIELD

The subject matter herein generally relates to devices for picking and tightening screws.

BACKGROUND

Generally, during a process of securing a screw into a workpiece, a suction nozzle of a device for picking and tightening screws first contacts the workpiece, which may cause damage to the workpiece. Such device for tightening screws is only suitable for an assembly where the screw hole is located on a flat plane.

BRIEF DESCRIPTION OF THE DRAWINGS

Implementations of the present technology will now be described, by way of embodiment, with reference to the attached figures.

DETAILED DESCRIPTION

Figure 1:
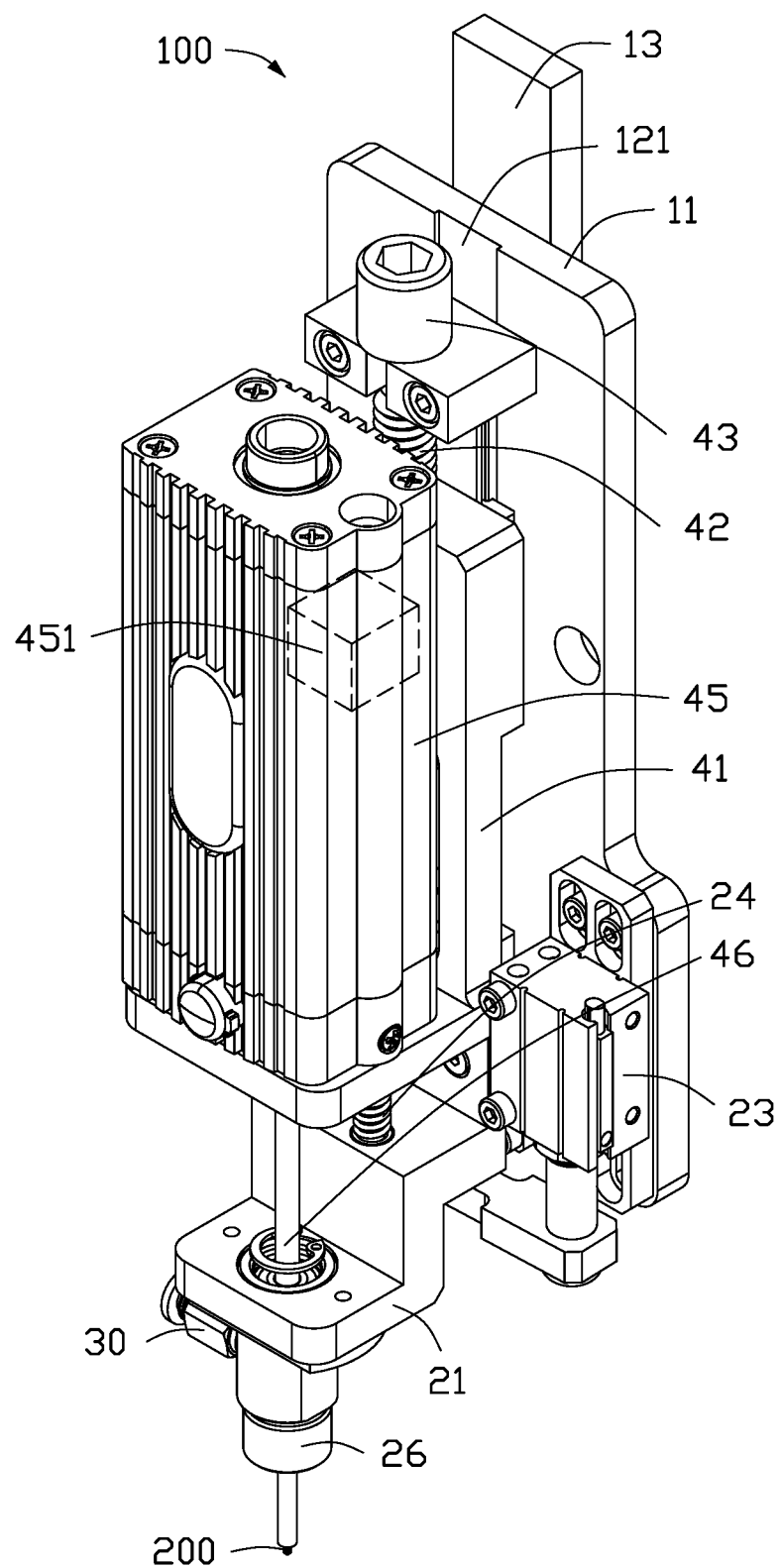
FIG. 1 is an isometric view of an embodiment of a device for picking and tightening screws.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as coupled, whether directly or indirectly through intervening components, and is not necessarily limited to physical connections. The connection can be such that the objects are permanently coupled or releasably coupled. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Figure 2:
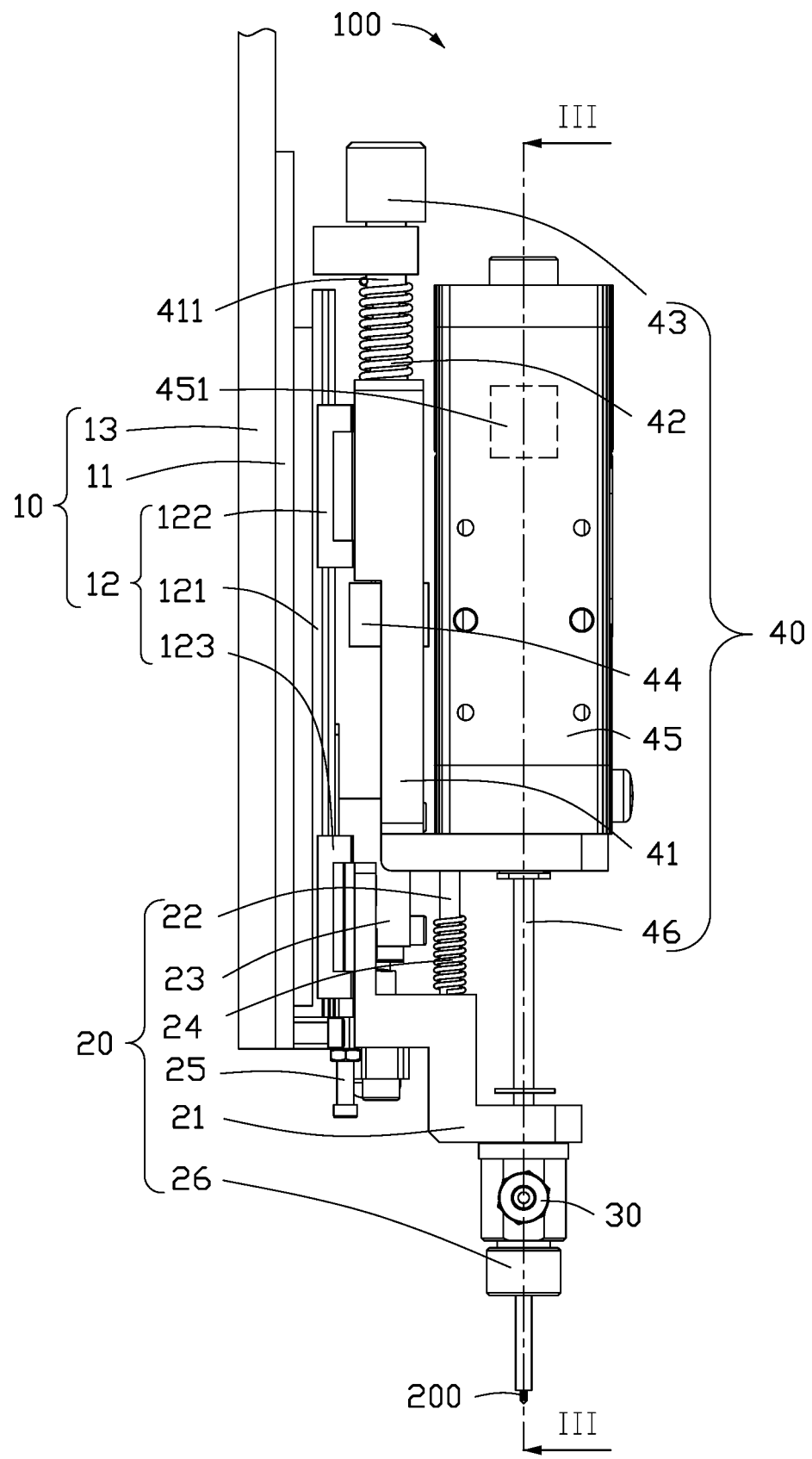
FIG. 2 is a side diagrammatic view of the device for picking and tightening screws of FIG. 1.
Figure 3:
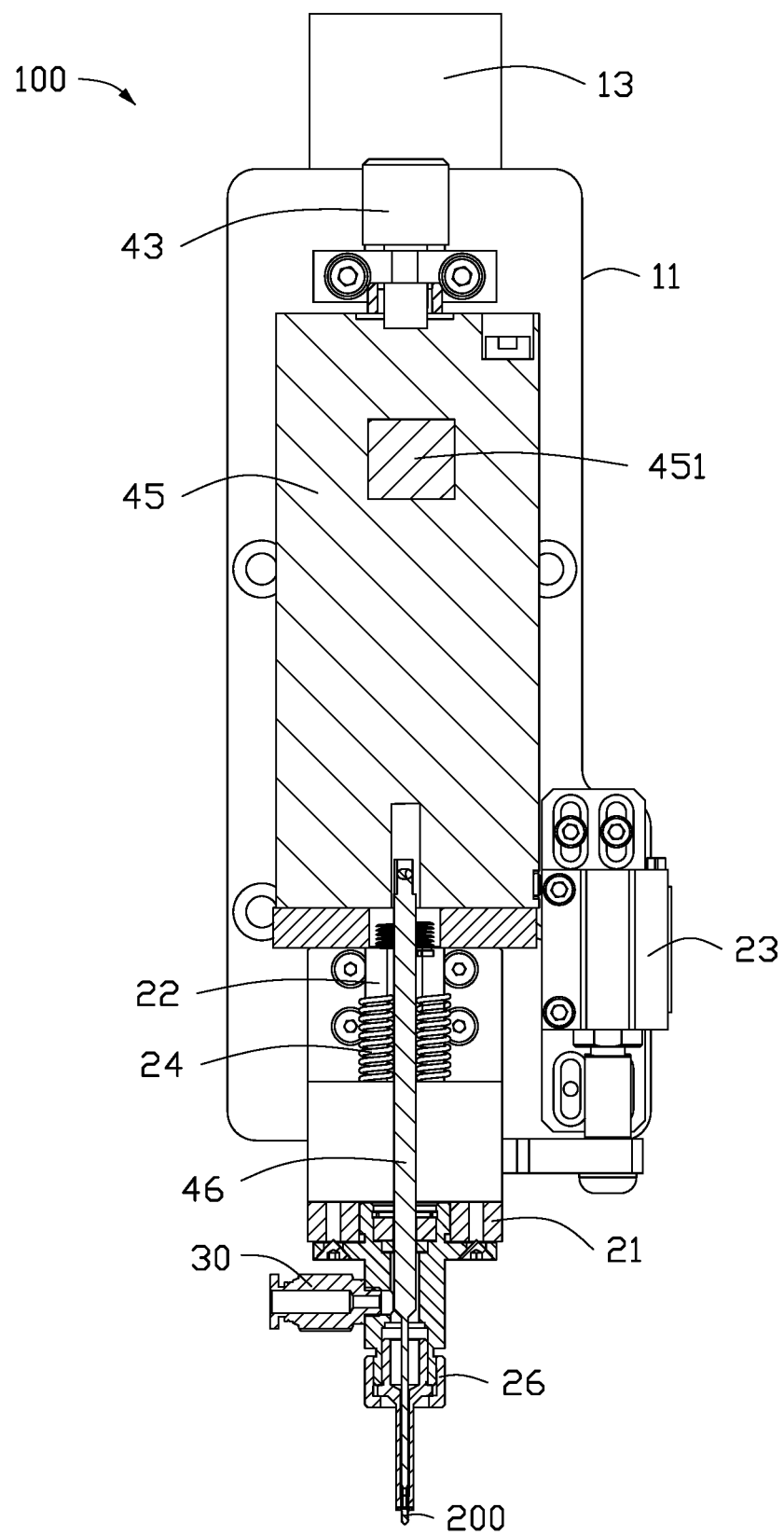
FIG. 3 is a front cross-sectional view of the locking device of FIG. 1.

FIGS. 1-3 illustrate a device 100 for picking and tightening screws, comprising a transporting unit 10, a suction nozzle unit 20, an electric screwdriver 40, and a vacuum generator 30.

In an alternative embodiment, the transporting unit 10 can drive the device 100 to move to a screw suction position or a screw locking position.

The suction nozzle unit 20 is fixedly coupled to the transporting unit 10. When the device 100 is moved to the screw suction position, the suction nozzle unit 20 is configured to attract a screw by suction.

The vacuum generator 30 is fixedly coupled to the suction nozzle unit 20. The vacuum generator 30 is configured to generate a vacuum to drive the suction nozzle unit 20 to apply suction to the screw 200.

The electronic screwdriver unit 40 is fixedly coupled to the transporting unit 10. When the device 100 is moved to the screw locking position, the electronic screw unit 40 is configured to tighten the screw 200.

All of the transporting unit 10, the vacuum generator 30, and the electronic screwdriver unit 40 are driven by a motor (not shown).

Figure 4:
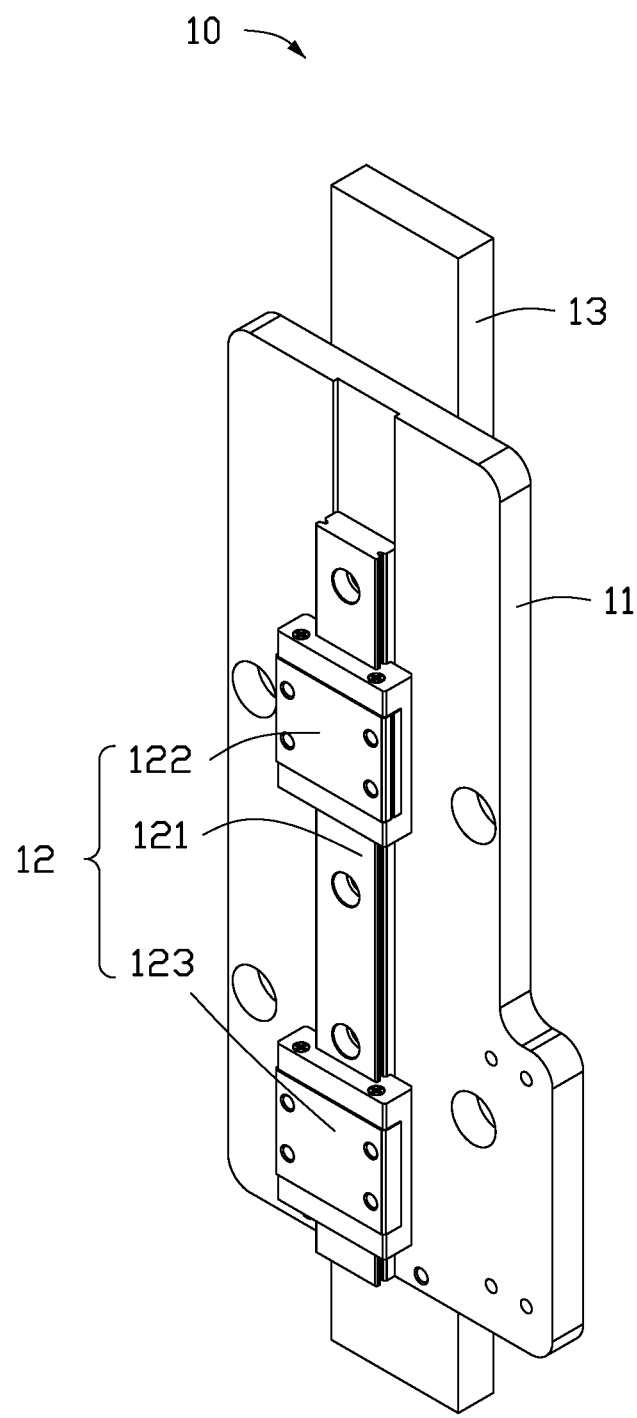
FIG. 4 is an isometric view of a transporting unit of the locking device of FIG. 1.

FIGS. 2 and 4 illustrate the transporting unit 10 comprising a baseplate 11, a sliding rail 12, and a main shaft 13.

The sliding rail 12 is arranged on the baseplate 11. The sliding rail 12 comprises a rail 121, an upper sliding block 122, and a lower sliding block 123. Both of the upper sliding block 122 and the lower sliding block 123 are arranged on the sliding rail 121.

The upper sliding block 122 is coupled to the electronic screwdriver unit 40, and is configured to drive the electronic screwdriver unit 40 to slide up and down on the rail 121. The lower sliding block 123 is coupled to the suction nozzle unit 20, and is configured to drive the suction nozzle unit 20 to slide up and down on the rail 121. The main shaft 13 is fixedly coupled to the baseplate 11, and is configured to drive the device 100 to move to the required screw suction position or screw locking position.

Figure 5:
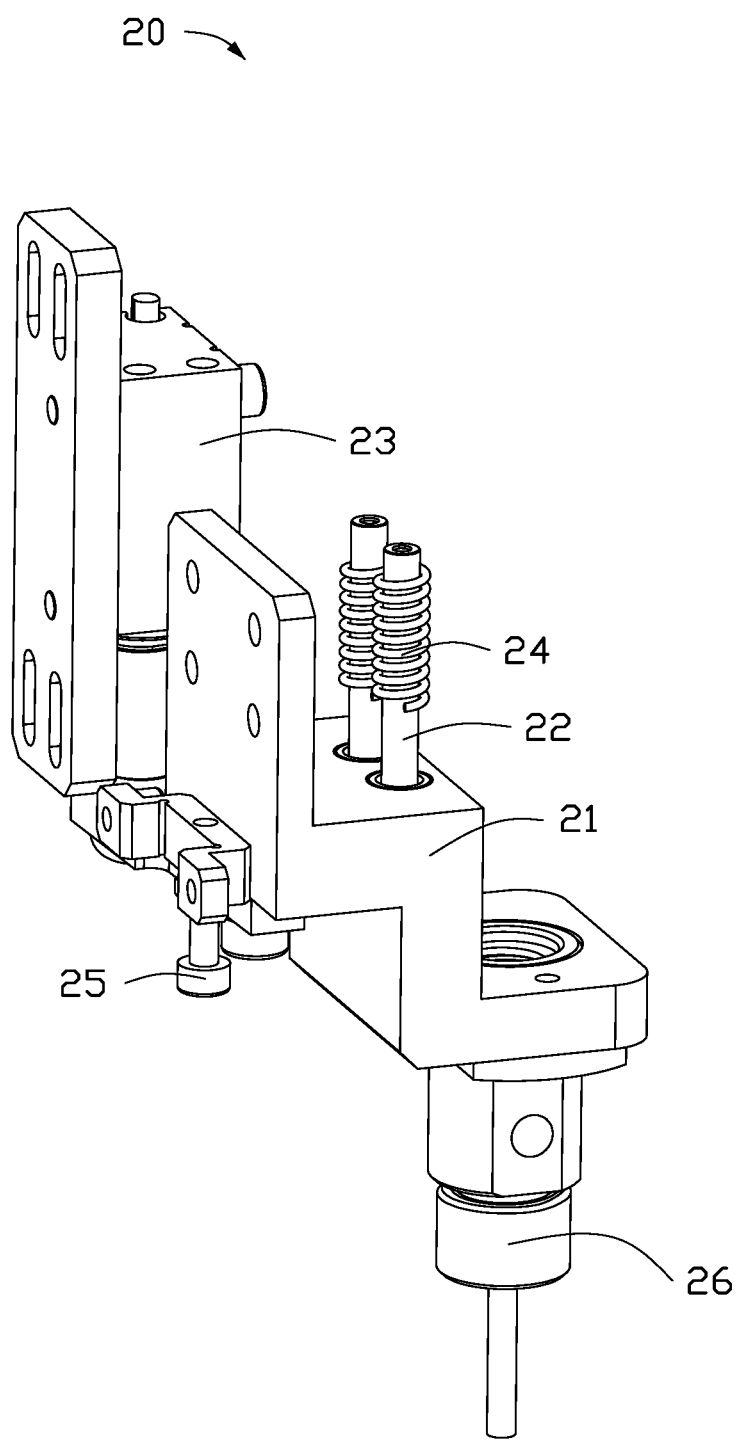
FIG. 5 is an isometric view of a suction nozzle unit of the locking device of FIG. 1.

FIGS. 2 and 5 illustrate the suction nozzle unit 20 comprising a suction nozzle connecting member 21, a guide pillar 22, a power mechanism 23, a first spring 24, a first bolt 25, and a suction nozzle 26.

An end of the suction nozzle connecting member 21 is fixedly coupled to the lower sliding block 123. The suction nozzle connecting member 21 is configured to connect to other parts of the suction nozzle unit 20.

The power mechanism 23 is coupled to the suction nozzle connecting member 21. The power mechanism 23 can be an air cylinder. The air cylinder is actuated to provide power to drive the suction nozzle connecting member 21, and the suction nozzle connecting member 21 drives the suction nozzle unit 20 to move up and down through the lower sliding block 123 along the sliding rail 12 and the guide pillar 22.

The guide pillar 22 is movably coupled to the suction nozzle connecting member 21. A lower end of the guide pillar 22 is coupled to the suction nozzle connecting member 21. An upper end of the guide pillar 22 is coupled to a lower end of a fixing member 41 of the electronic screwdriver unit 40. The suction nozzle connecting member 21 can be moved up and down through the guide pillar 22.

The first spring 24 is sleeved on the guide pillar 22. A lower end of the first spring 24 is compressed by the suction nozzle connecting member 21 arranged on the guide pillar 22.

The first bolt 25 is located on a baseplate of the suction nozzle connecting member 21. The first bolt 25 is configured to adjust the degree of compression applied to the first spring 24 by adjusting an upward pressure on the suction nozzle connecting member 21. The downward elastic force of the first spring 24 to the suction nozzle unit 20 is thus adjusted.

FIG. 3 illustrates that an upper end of the suction nozzle 26 is coupled to a lower end of the suction nozzle connecting member 21, and is sealed by the suction nozzle connecting member 21. The suction nozzle 26 defines an opening on a side face to communicate with the vacuum generator 30. Air can enter and leave only through a lower opening defined on a lower end of the suction nozzle 26. When the vacuum generator 30 generates a vacuum, a pressure inside the suction nozzle 26 is reduced, thus the screw 200 close to the suction nozzle 26 is sucked into the suction nozzle 26.

Figure 6:
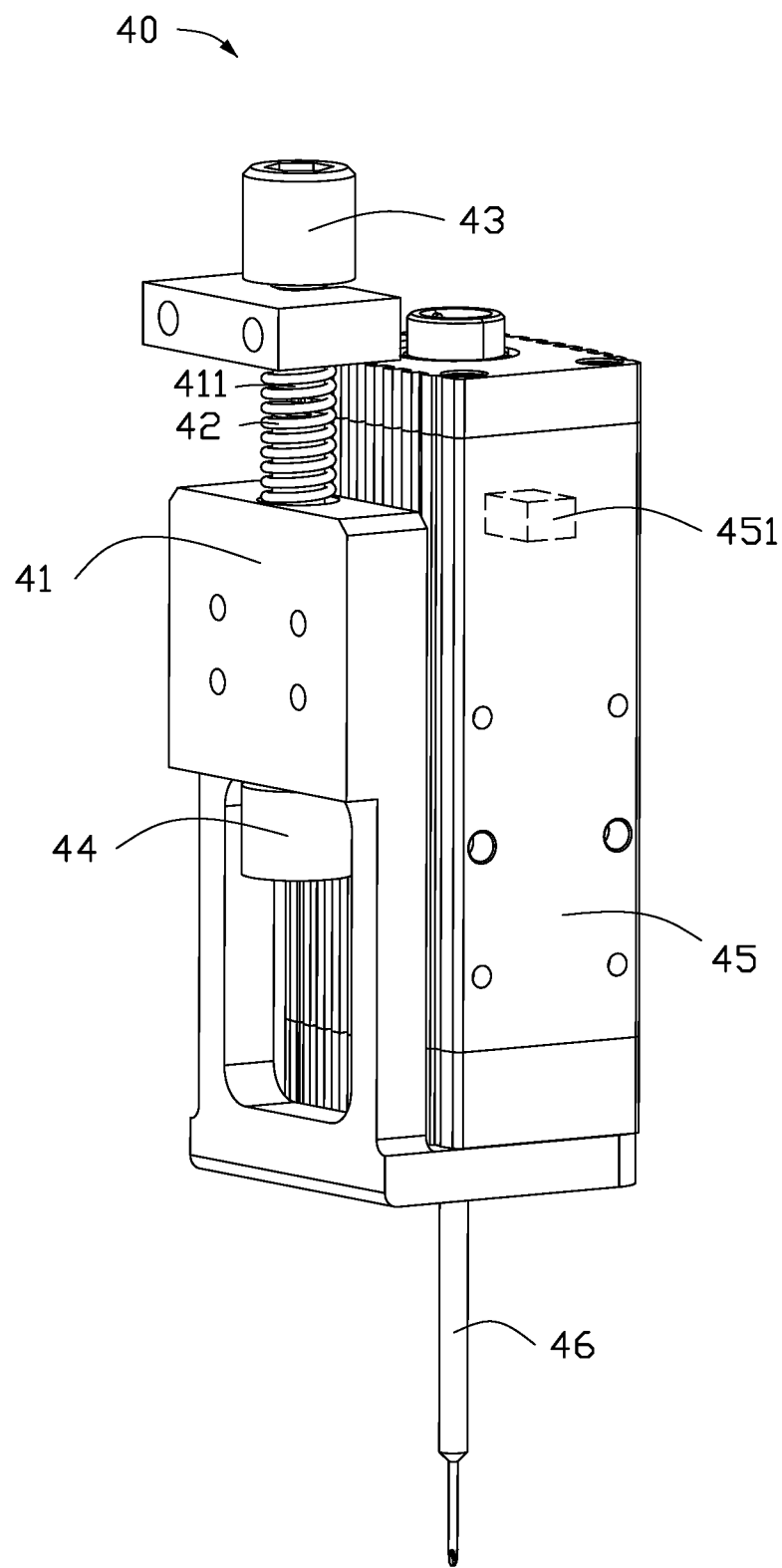
FIG. 6 is an isometric view of an electric screwdriver unit of the locking device of FIG. 1.

FIGS. 2 and 6 illustrate the electronic screwdriver unit 40 including a fixing member 41, a second spring 42, a second bolt 43, a block 44, an electronic screwdriver 45, and a screwdriver head 46.

The fixing member 41 defines a through hole passing through two opposite ends of the fixing member 41. An extending column 411 is received in the through hole of the fixing member 41, and outside of opposite ends of the extending column 411 is exposed. The fixing member 41 is fixedly coupled to the upper sliding block 122 of the sliding rail 12. The fixing member 41 is configured to drive the electronic screwdriver unit 40 to move up and down through the upper sliding block 122.

The second spring 42 is sleeved on an upper end of the extending column 411. The second spring 42 is compressed to produce a downward elastic force to cushion upward movement of the electronic screwdriver unit 40.

The second bolt 43 is screwed with screw threads defined on the upper end of the extending column 411. The second spring 42 is arranged between the fixing member 41 and the second bolt 43. The second bolt 43 can adjust the degree of compression of the second spring 42 to adjust the elastic force to the electronic screwdriver unit 40.

The block 44 is sleeved on a lower end of the extending column 411. The block 44 is configured to block the lower end of the fixing member 41 to stabilize the position of the fixing member 41 on the extending column 411.

The electronic screwdriver 45 is fixedly coupled to the lower end of the fixing member 41, and is supported by the fixing member 41. When the electronic screwdriver 45 rotates, the electronic screwdriver 45 drives the screwdriver head 46 to rotate.

The screwdriver head 46 is fixedly coupled to the electronic screwdriver 45 and extends into the electronic screwdriver 45.

FIG. 3 illustrates that the upper end of the suction nozzle 26 is sleeved on a lower end of the screwdriver head 46. When the screw 200 is sucked into the suction nozzle 26, the screw 200 contacts an end of the screwdriver head 46. The screwdriver head 46 is rotated to guide the screw, so that a nut groove of the screw 200 is matched with a thread form defined on an end of the screwdriver head 46.

FIG. 6 illustrates that the electronic screwdriver 45 further comprises a sensor 451. The sensor 451 is arranged within the electronic screwdriver 45, and the sensor 451 detects the number of turns and a torque applied to the screw 200. When the number of turns and the torque displayed by the sensor 451 reach a preset value, the electronic screwdriver 45 stops rotating, and the screwdriver head 46 driven by the electronic screwdriver 45 also stops turning the screw 200.

A working principle of the device 100 is explained below.

In a first step, the main shaft 13 is driven by a motor (not shown) to drive the device 100 to drop to the screw suction position.

The vacuum generator 30 is driven by a motor to generate vacuum, and the negative air pressure generated by the vacuum generator 30 causes the suction nozzle 26 to attract the screw 200 by suction. The lower end of the screwdriver head 46 contacts the screw 200. The screwdriver 45 is driven and rotated by a motor to drive the screwdriver head 46 to rotate, and the screwdriver head 46 rotates to guide the screw 200, so that the nut groove of the screw 200 is matched with the end of the screwdriver head 46.

In a second step, the main shaft 13 is driven by a motor (not shown) to drive the device 100 to move to the screw locking position.

The power mechanism 23 being coupled to the suction nozzle connecting member 21 and the suction nozzle connecting member 21 being coupled to the lower sliding block 123, the power mechanism 23 can move upwardly to drive the suction nozzle unit 20 upward to avoid workpieces located in the screw locking position, through the lower sliding block 123 of the sliding rail 12 and the guide pillar 22. At this point, the first spring 24 sleeved on the guide pillar 22 is compressed.

In a third step, the main shaft 13 is driven by a motor (not shown) to lower the device 100. The electronic screwdriver 45 is driven to rotate by the motor, and the screwdriver head 46 also tightens the screw 200.

When the screw 200 is tightened downward to a preset position, the suction nozzle 26 contacts the workpiece. While the screw 200 continues to be tightened downward, the suction nozzle 26 is pushed upward by the workpiece, because the workpiece gives the suction nozzle 26 a reaction force. At this time, the fixing member 41 moves up along the extending column 411 and compresses the second spring 42 to cushion the force of reaction, to avoid wear of suction nozzle 26 caused by hard contact between the suction nozzle 26 and the workpiece.

In a fourth step, when the sensor 451 of the electronic screwdriver 45 detects that the number of turns and the tightening torque applied to the screw 200 reach the preset value, the motor of the electronic screwdriver 45 is controlled to stop, the electronic screwdriver 45 stops rotating, and the screwdriver head 46 stops turning.

The main shaft 13 is then driven by the motor to drive the device 100 to move upwards, the screwdriver head 46 is separated from the screw 200, the force mechanism 23 returns downward to an initial position, and the first spring 24 releases elastic force to push the suction nozzle unit 20 downward and reset.

Thus, the device 100 can complete the picking and tightening of the screw 200.

Both of the first bolt 25 and the second bolt 43 are adjustable, the adjustable bolts adjust the degree to which the spring is compressed. During operations, when the first bolt 25 is tightened, the suction nozzle connecting member 21 moves upward along the guide pillar 22 under the thrust of the first bolt 25, making the first spring 24 shorter. Similarly, when the first bolt 25 is unscrewed, the first spring 24 becomes longer. When the second bolt 43 is tightened, the second spring 42 is squeezed downward and shortened by the second bolt 43. Similarly, when the second bolt 43 is unscrewed, the second spring 42 becomes longer.

It can be understood that the suction nozzle of the disclosure does not touch the workpiece during a screw locking process, which isolates the workpiece from any damage.

It can be understood that the device can be configured for locking a screw hole with a step around it by moving the suction nozzle unit, the device has a wide range of application.

It can be understood that the screw is guided by the turning of the screwdriver head.

It can be understood that the suction nozzle unit relies on a double guidance of the guiding column and the sliding rail to ensure the verticality of the screwdriver head and the workpiece, and thereby improve accuracy of the process.

It can be understood that the device for picking and tightening screws can adjust a downforce through the spring, which effectively protects the screw.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A device for picking and tightening screws, driven by a motor, comprising:
   a transporting unit configured to drive the device to move to a screw suction position or a screw locking position, the transporting unit comprising a baseplate, a sliding rail arranged on the baseplate, and a main shaft fixedly coupled to the baseplate, wherein the sliding rail comprises a rail, an upper sliding block arranged on the rail, and a lower sliding block arranged on the rail;
   a suction nozzle unit fixedly coupled to the transporting unit, wherein when the device is moved to the screw suction position, the suction nozzle unit is configured to attract a screw by suction;
   a vacuum generator fixedly coupled to the suction nozzle unit and configured to generate a vacuum to drive the suction nozzle unit to apply suction to the screw; and
   an electronic screwdriver unit fixedly coupled to the transporting unit, wherein when the device is moved to the screw locking position, the electronic screwdriver unit is configured to tighten the screw.

2. The device of claim 1, wherein the suction nozzle unit comprises a suction nozzle connecting member, a guide pillar, a power mechanism, a first spring, a first bolt, and a suction nozzle, the suction nozzle connecting member is fixedly coupled to the lower sliding block, the lower end of the guide pillar is coupled to the suction nozzle connecting member, the upper end of the guide pillar is coupled to the electronic screwdriver unit, the power mechanism is coupled to the suction nozzle connecting member, the first spring is sleeved on the guide pillar, the first bolt is located on a baseplate of the suction nozzle connecting member, the suction nozzle is coupled to a lower end of the suction nozzle connecting member.

3. The device of claim 2, wherein the electronic screwdriver unit comprises a fixing member, a second spring, a second bolt, a block, an electronic screwdriver, and a screwdriver head, the fixing member defines an extending column extending up and down from an inside of the fixing member, the second spring is sleeved on an upper end of the extending column, the second bolt is screwed with the upper end of the extending column, the block is sleeved on a lower end of the extending column, the electronic screwdriver is fixedly coupled to the lower end of the fixing member and supported by the fixing member, the screwdriver head is fixedly coupled to the electronic screwdriver and extended into the electronic screwdriver.

4. The device of claim 3, wherein the second bolt adjusts an elastic force of the second spring applied to the electronic screwdriver unit by adjusting the degree of compression applied to the second spring.

5. The device of claim 3, wherein the electronic screwdriver unit further comprises a sensor, the sensor is arranged within the electronic screwdriver and configured to detect the number of turns and a torque applied to the screw.

6. The device of claim 3, wherein the suction nozzle is sleeved on the screwdriver head of the electronic screwdriver unit.

7. The device of claim 2, wherein the first bolt adjusts an elastic force of the first spring applied to the suction nozzle unit by adjusting the degree of compression applied to the first spring.

8. The device of claim 2, wherein the vacuum generator communicates with an opening defined on a side of the suction nozzle, an upper end of the suction nozzle is coupled to and sealed by the suction nozzle.

9. The device of claim 1, wherein the upper sliding block is coupled to the electronic screwdriver unit and configured to drive the electronic screwdriver unit to slide up and down on the rail, the lower sliding block is coupled to the suction nozzle unit and configured to drive the suction nozzle unit to slide along on the rail, the main shaft is configured to drive the device to move to a required position.

\* \* \* \* \*